United States Patent [19]
Engel

[11] Patent Number: 5,564,606
[45] Date of Patent: Oct. 15, 1996

[54] PRECISION DISPENSING PUMP FOR VISCOUS MATERIALS

[76] Inventor: Harold J. Engel, 18932 Olympia St., Northridge, Calif. 91326

[21] Appl. No.: 293,329

[22] Filed: Aug. 22, 1994

[51] Int. Cl.⁶ .................................................. G01F 11/20
[52] U.S. Cl. .......................................... 222/261; 222/413
[58] Field of Search ............................ 222/63, 256, 260, 222/261, 278, 412, 413; 118/697, 410, 243, 401; 366/88, 89; 198/675

[56] References Cited

U.S. PATENT DOCUMENTS

| | | | |
|---|---|---|---|
| 1,746,604 | 2/1930 | Piquerez | 222/278 |
| 3,118,184 | 1/1964 | Stevenson | 222/260 |
| 4,387,834 | 6/1983 | Bishop | 222/413 |
| 4,572,103 | 2/1986 | Engel | 222/260 |
| 5,244,123 | 2/1993 | Benedict | 222/260 |
| 5,265,773 | 11/1993 | Harada | 222/261 |

Primary Examiner—Andres Kashnikow
Assistant Examiner—Philippe Derakshani
Attorney, Agent, or Firm—Linval B. Castle

[57] ABSTRACT

A viscous fluid dispensing pump such as used on the mechanical arms of computer controlled dispensing systems introduces the fluid into the center of a vertical bore having a dispensing tube at the bottom and a variable pitch thread feed screw in the bore rotated by a precision servo motor. An alternate embodiment describes a conical shaped feed screw with linear pitch turning in a conical shaped sleeve in the bore. In both embodiments, the viscous material is homogenized with gas and low viscosity particles and the servo motor accurately controls the amount of deposition.

15 Claims, 3 Drawing Sheets ns and the sleeve reduces the volume of the material being pumped and compresses any gas that may be present.

PRECISION DISPENSING PUMP FOR VISCOUS MATERIALS

This invention relates to fluid pumps and particularly to a precision viscous fluid dispensing pump such as used in the computer controlled systems for depositing small quantities of solder paste, adhesive, conductive epoxy, or other materials on circuit boards or other surfaces.

BACKGROUND OF THE INVENTION

Systems for the deposition of drops of adhesive, conductive epoxy, soldering paste, and other viscous fluids at discrete locations on various surfaces are extensively used in modern manufacturing techniques and complex computer systems have been developed for directing the fluid dispenser to precise locations on any surface.

The fluid dispenser is generally comprised of a large syringe for storing the viscous fluid which is pneumatically forced into a small pump chamber, a reciprocating pump with a piston rod or needle that passes through the chamber and drives the fluid out of a small tubular dispensing tip. These fluid dispensers are quite satisfactory provided the fluid is of consistent viscosity and do not contain air because minute gas bubbles in a fluid compress causing sputtering and an uneven deposition.

The invention to be described is for a viscous fluid dispensing pump having a rotary feed screw for driving the viscous fluid out of the small dispensing tip. The rotary screw, which is driven by a servo motor, has a continually reducing variable pitch which acts to homogenize low viscosity components, such as trapped gas, with the relatively high viscosity material having a viscosity in the order of 5000 or more centipoise. As the viscous material enters, the volume between the threads and the cylinder wall is relatively large. As the material progresses the variable pitch of the screw causes the material to compress and mix as the volume reduces. The servo motor gives an accurate control of the amount of rotation of the screw and hence the output of the pump and also give the ability to vary the feed rate, hence makes the system easily adaptable to complete computer control.

A second embodiment is described, which operates on the same principle and is easier to manufacture, employs a rotary screw having linear threads but with a tapered or conical diameter.

DESCRIPTION OF THE DRAWINGS

In the drawings which illustrate the preferred embodiment of the invention.

DETAILED DESCRIPTION

Figure 1:
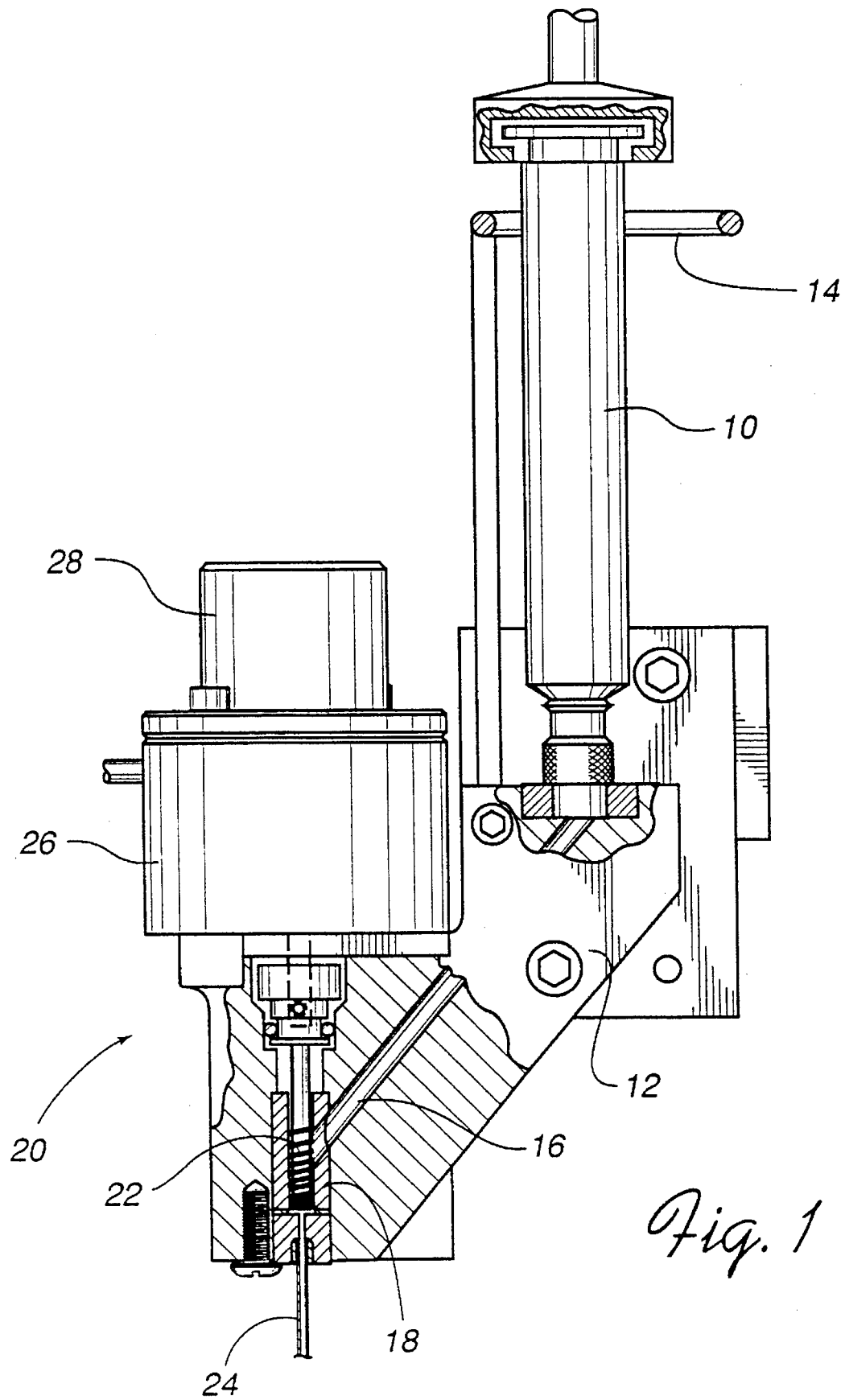
FIG. 1 is an elevational view, partially in section, of the viscous fluid dispenser or the invention.

FIG. 1 illustrates a viscous fluid dispenser of the type which is carried and positioned by a computer controlled electro-mechanical positioning mechanism in X, Y an Z directions so that it may deposit a predetermined amount of viscous fluid upon the surface of work in the process of being manufactured. The viscous fluid is usually an adhesive, conductive epoxy, solder paste or other material that may have a viscosity in the order of 5000 centipoise.

The viscous fluid dispenser of the invention is typically comprised of a relatively large fluid storage syringe 10 which is mounted to the structure 12 supported by the positioning mechamism and guarded by an optional syringe brace 14. The syringe 10 contains a piston to which a low air pressure of 5–10 psi is applied to force the viscous fluid from the syringe down through a passage 16 into the bore of a sleeve 18 in the fluid pump 20. If a source of low pressure air is not readily available, the piston within the syringe may be actuated by other means.

Figure 2:
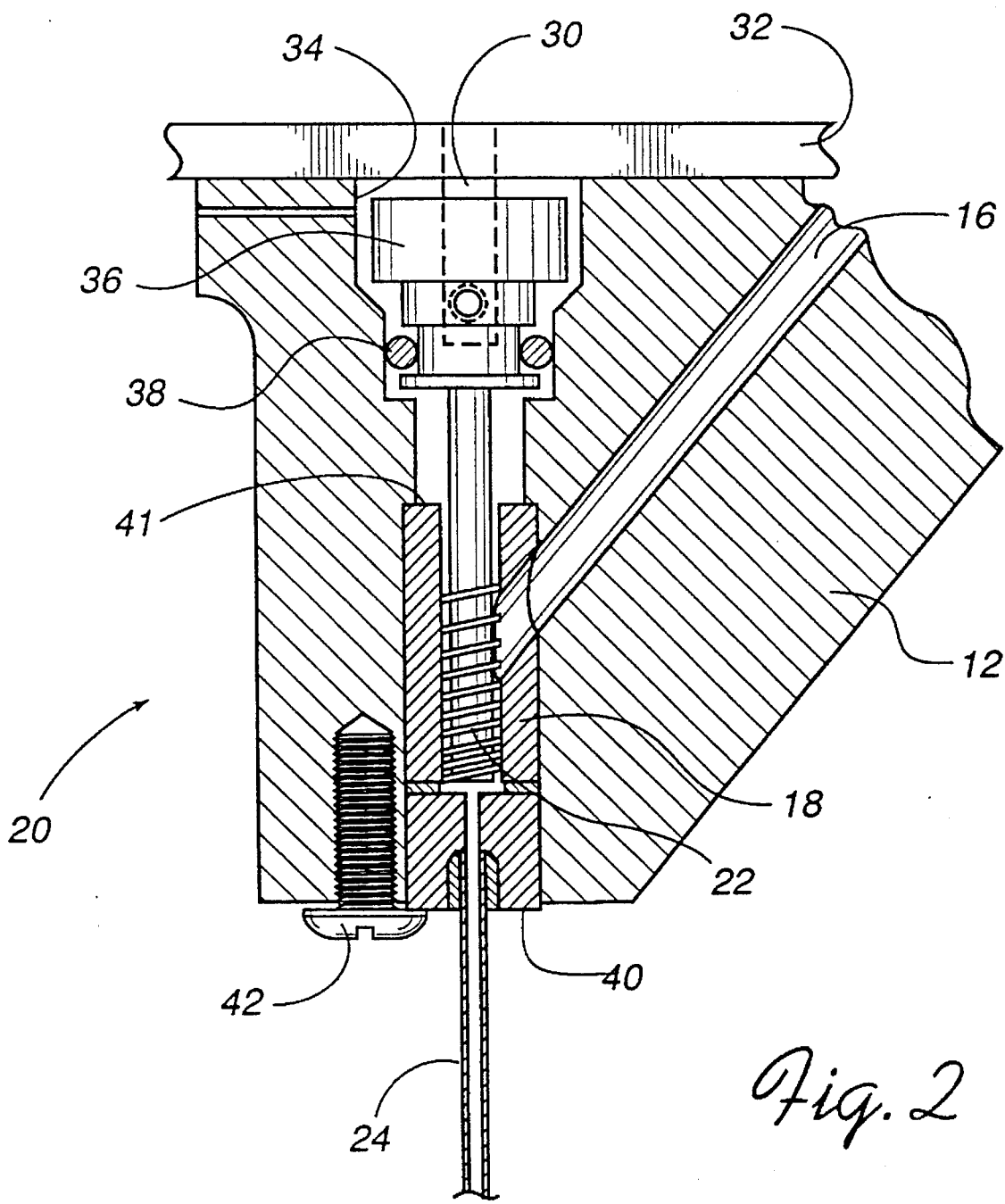
FIG. 2 is a detailed view illustrating the dispensing pump and the variable pitch rotatable screw.

As shown in FIG. 2, the bore of the sleeve 18 is smooth with parallel walls and the passage 16 from the syringe 10 enters the bore near the center of the length of the sleeve. Entering the bore of sleeve 18 at a first end and extending throughout its length is a rotatable feed screw 22 having threads with parallel lands that have a diameter slightly less that the diameter of the bore so that the screw lands make sliding contact with the wall of the bore. Rotatable screw 22 has a wide pitch at the first end and at the entrance of the passage 16, the threads becoming narrower and closer together as the screw approaches the exit end. This variable pitch very effectively homogenizes the low viscosity components such as trapped gas with the higher viscosity material to be deposited through the dispensing tube 24 near the exit end.

Rotatable feed screw 22 is driven by a high precision servo motor 26 equipped with an encoder and or a tachometer 28 to accurately control the movement of the screw as shown in FIG. 1. Thus, as the servo motor is rotated a certain amount, the variable pitch of the screw 22 causes material captured between the threads and the walls of the bore of sleeve 18 to compress and reduce in volume so that when the material is discharged through dispensing tube 24 there is an accurate control over the viscous materials rate of feed and, with the servo motor 26, the subsequent volume. The use of a servo motor also features the ability to vary the feed rate on a feeder controlled basis, a feature not heretofore available.

The servo motor 26 is mounted above the pump with its rotatable shaft 30 vertically aligned to pass through a motor subplate 32 where it enters a vertical coaxial bore 34 opening through the top of structure 12. There the end of the motor shaft 30 is connected to a screw coupling 36 which is maintained centered and sealed by a elastometric rotating seal which is connected to the rotatable feed screw 22. Screw 22 is rotatable in the sleeve 18 which is within the vertical coaxial bore 34.

As best illustrated in FIG. 2 the exit or lower end of the sleeve 18 is approximately even with the lower end of the screw 22 and is separated from a dispensing tube coupling 40 by a gasket which fits within the coaxial bore 34 at the lower end of the structure 12. The dispensing tube coupling 40, the gasket, and the sleeve 18 are retained in the bore against the bore shoulder 41 and by a screw 42.

Figure 3:
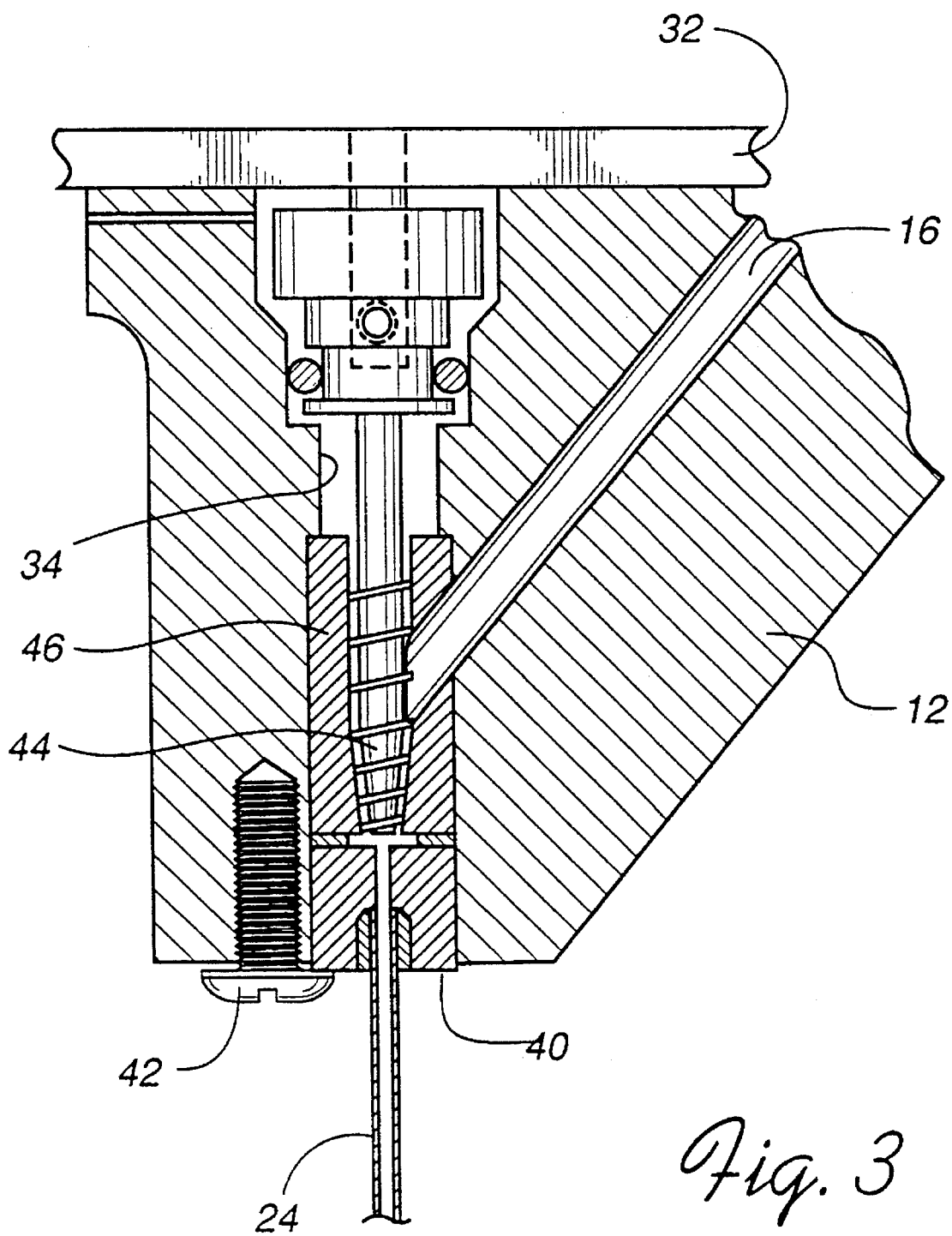
FIG. 3 is a detailed view of an alternate embodiment of the pump showing the fixed pitch, tapered, rotatable screw.

FIG. 3 illustrates an alternate embodiment that functions the same as the pump of FIG. 2 but which may be easier to manufacture. In FIG. 2, the rotatable feed screw 22 rotated within sleeve that had a tubular bore with parallel side walls and pressed the gas and low viscosity fluids from the material being dispensed by variably pitch threads on the screw. The embodiment of FIG. 3 employs a conic or tapered feed screw 42 with linear threads in a sleeve 44 with a tapered tubular bore. As material is fed into the large diameter bore of sleeve 44 it is forced toward the small diameter end and the reduction is area between the thread lands and the tapered walls of the sleeve 46 is reduced, hence a reduction is volume. It should be noted that the clearance between the thread lands of screw 44 and the tapered sleeve 46 can be adjusted.

An advantage of the dispensing pump is that it can readily be adapted to computer control, and its servo motor control is particularly valuable where it is necessary to dispense predetermined varying deposits of a fluid at various locations.

I claim:

1. A dispensing pump for viscous materials comprising;

a housing having a bore therethrough, said bore having first and second ends;

a dispensing tube extending from the second end of said bore;

a tubular sleeve in said bore;

supply means for introducing a continuous supply of the viscous material into said tubular sleeve;

a rotatable feed screw in said tubular sleeve and coaxial therewith, said feed screw having threads that entrap said viscous material in a relatively large volume bounded by said threads and the wall of said sleeve and which, upon rotation of said screw, force said material toward said dispensing tube while compressing and reducing the volume of the material between said threads and the wall of said sleeve; and rotating means at the first end of said bore for rotating said rotatable feed screw a predetermined amount.

2. The dispensing pump claimed in claim 1 wherein said supply means introduces said viscous material through an opening in the wall of said tubular sleeve.

3. The dispensing pump claimed in claim 2 wherein said supply means includes a passage through said housing extending from a source of said viscous material to said opening in the wall of said tubular sleeve.

4. The dispensing pump claimed in claim 2 wherein said rotating means is a servo motor.

5. The dispensing pump claimed in claim 4 wherein the interior walls of said tubular sleeve are parallel and wherein said feed screw have threads whose lands are in sliding contact with said interior walls, said threads having a variable pitch that decreases as said threads approach the second end of said bore.

6. The dispensing pump claimed in claim 4 wherein the interior walls of said tubular sleeve are tapered and the diameter become smaller near the second end of said bore and wherein said feed screw has threads whose lands are in sliding contact with said interior walls, said threads having a linear pitch.

7. A viscous fluid dispensing pump comprising:

a body having a bore therethrough, said body bore having first and second ends and a shoulder between said first and second ends;

a sleeve in said body bore, said sleeve abutted against said shoulder;

a dispensing tube in the second end of said body bore and held against said tube, said dispensing tube being open to said sleeve;

means for admitting a flow of viscous material through a wall of said sleeve and into a sleeve bore that is coaxial with said body bore;

a servo motor at said first end of said body bore, said servo motor having a rotatable shaft coaxial with said body bore;

a rotatable feed screw attached to said rotatable shaft, the threads of said feed screw cooperating with the wall of said sleeve bore for compressing and reducing the volume of the viscous material as said feed screw forces said material through said sleeve.

8. The dispensing pump claimed in claim 7 wherein said dispensing tube is urged against an end of said sleeve to seat said sleeve against said shoulder, and wherein said dispensing tube is held by a machine screw.

9. The dispensing pump claimed in claim 8 wherein said means for admitted a flow of viscous material includes a passage through said body from a source of said material to said sleeve.

10. The dispensing pump claimed in claim 9 wherein said servo motor is monitored by an encoder.

11. The dispensing pump claimed in claim 9 wherein said servo motor is monitored by a tachometer.

12. The dispensing pump claimed in claim 9 wherein said servo motor is monitored by an encoder and a tachometer.

13. The dispensing pump claimed in claim 9 wherein the interior wall of said sleeve are parallel and said feed screw has variable pitch threads that have a wide pitch at the point where said viscous material is admitted into said sleeve, the pitch becoming narrow at the point where said viscous material enters said dispensing tube.

14. The dispensing pump claimed in claim 9 where said feed screw is tapered with linear pitch threads and wherein said interior wall of said sleeve has an identical taper.

15. The dispensing pump claim in claim 9 wherein the dispensing rate may be computer controlled.

* * * * *